Aug. 4, 1931.  F. H. HEADLEY  1,817,513
PERAMBULATOR OR THE LIKE
Filed April 17, 1930   2 Sheets-Sheet 2
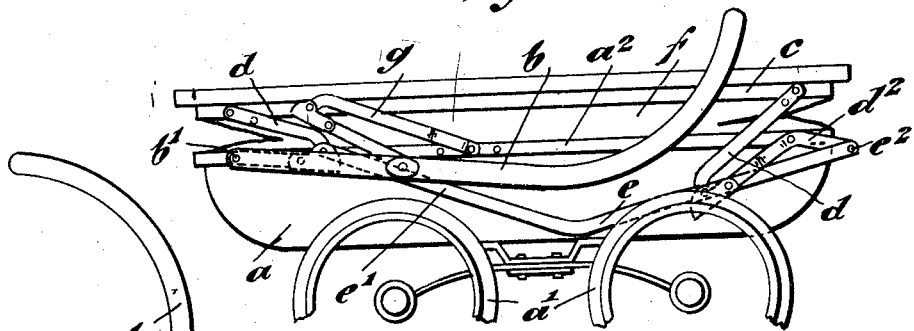
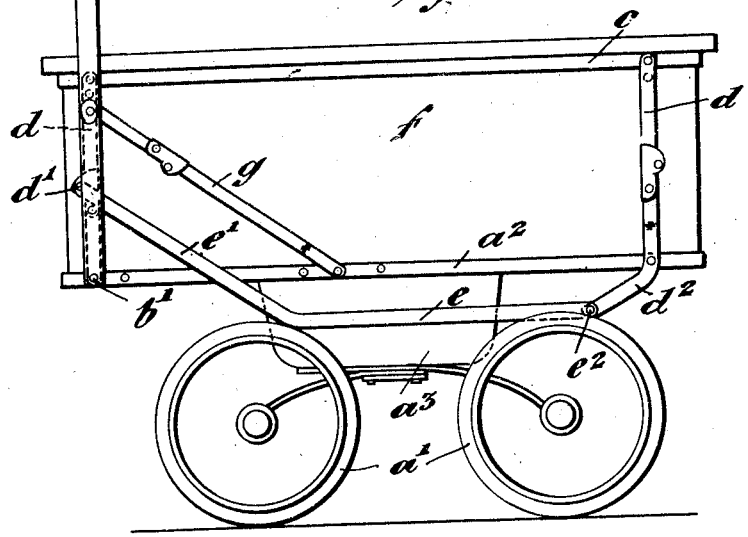
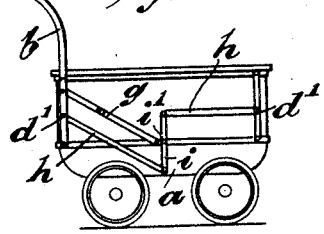
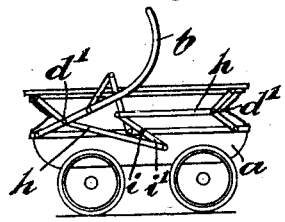
Inventor
Frederick H. Headley
by Arthur Wm Nelson
Atty Patented Aug. 4, 1931

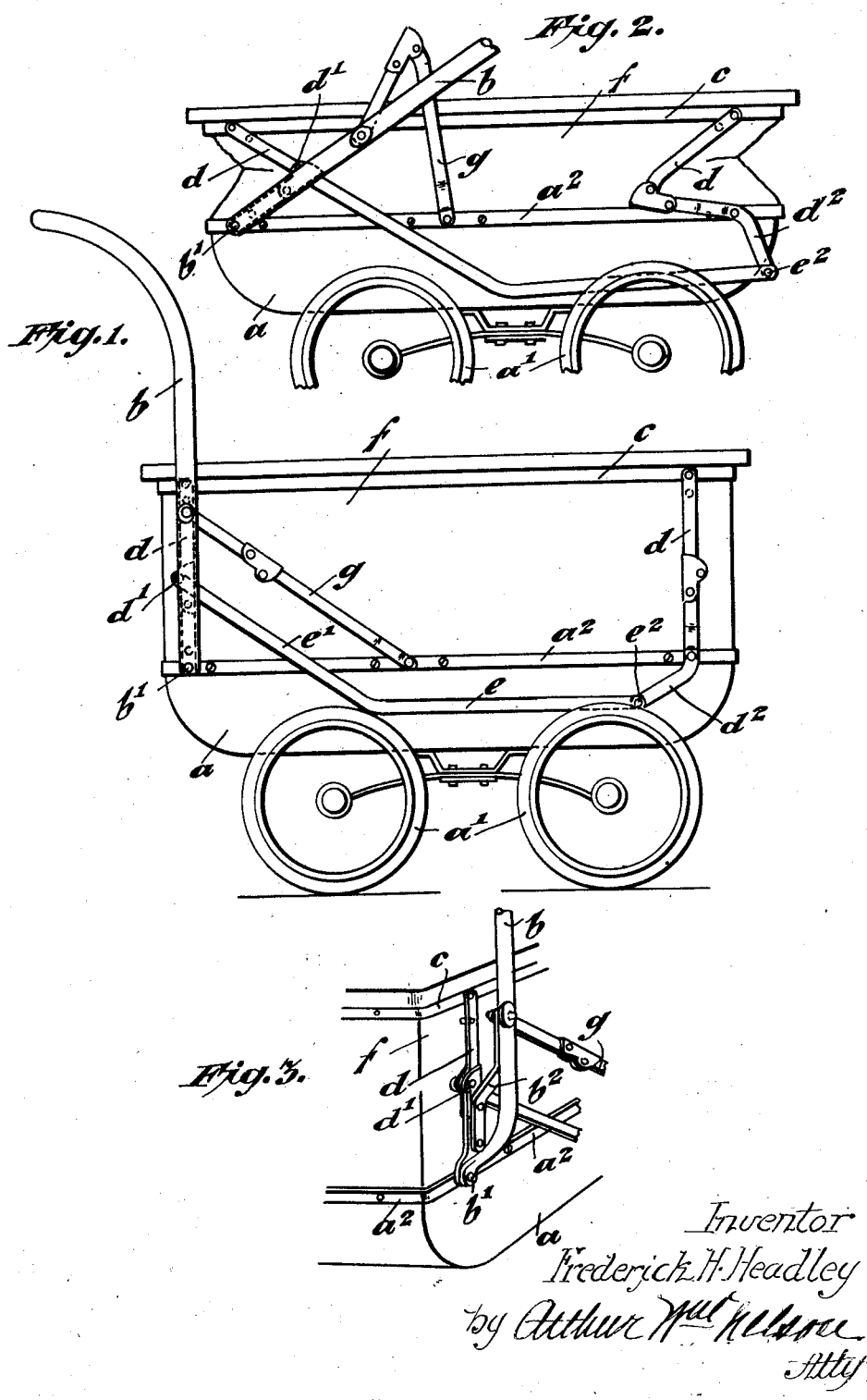

1,817,513

UNITED STATES PATENT OFFICE

FREDERICK HAGGER HEADLEY, OF BIRMINGHAM, ENGLAND

PERAMBULATOR OR THE LIKE

Application filed April 17, 1930, Serial No. 445,026, and in Great Britain August 6, 1929.

The present invention has relation to perambulators or like vehicles, more particularly those of a collapsible character, the present invention having for its object in one instance to provide a vehicle capable of being readily collapsed into a small area, and in a second instance to provide a semi-collapsible and semi-permanent vehicle which when extended has the appearance and comfort of the so-called "bassinette" but which shall have the storage facilities of the folder.

In order that this invention may be clearly understood and readily carried into practice, reference may be had to the appended explanatory sheet of drawings, upon which:—

Figure 1 illustrates a perambulator constructed according to the present invention in side elevation.

Figure 2 is a fragmentary view illustrating the said perambulator in the paritally collapsed condition.

Figure 3 is a fragmentary view hereinafter referred to.

Figure 4 illustrates the perambulator in elevation in the completely collapsed condition.

Figure 5 illustrates a slightly modified construction.

Figures 6 and 7 illustrate diagrammatically a further modification of the present invention.

In a convenient embodiment of the present invention as applied to a collapsible bassinette type of vehicle illustrated in Figures 1, 2, 3 and 4, a shallow box-like underframe $a$ is provided with wheels $a^1$ suitably sprung in relation thereto. Around the top edge of this shallow box-like underframe $a$ a metallic strip $a^2$ is placed, and a handle $b$ is pivoted at $b^1$ to this strip $a^2$, and at each extremity the said strip is adapted to carry an upper frame $c$ through the medium of a toggle or link mechanism $d$ at each end of the vehicle, and on each side thereof, that is to say, four toggle or link systems $d$ are provided two at each end of the vehicle. These toggle or link systems $d$ may be virtually in the nature of jointed struts such as are used on the folding hoods of perambulators and their arrangement is such that they may be "broken" towards one another to bring the upper frame $c$ into adjacency with the lower frame $a^2$ (Figure 4) or alternatively, "aligned" to hold the upper frame $c$ away from the lower frame $a^2$ (Figure 1). The handle $b$ is provided on a pivot $b^1$ common to the lower pivot of a toggle or link system $d$ and is connected to the lower link member thereof by the arm $b^2$ (see particularly Figure 3) in such a manner that when the handle is broken downwardly the toggle or link system $d$ is broken inwardly. From the pivot $d^1$ of this toggle or link system $d$ a connecting link $e$ extends firstly downwardly as at $e^1$ then horizontally as at $e$ where it is connected by a pivot $e^2$ to a downwardly cranked extension $d^2$ of the toggle or link system $d$ at the opposite extremity of the vehicle, the arrangement being such that when the handle $b$ is folded downwardly not only its associate toggle or link system $d$ is broken inwardly but the opposed toggle or link system $d$ is also broken inwardly. In this manner by folding the handle downwardly the upper frame $c$ is brought into adjacency with the lower frame or strip $e$ and the device collapsed. Between the respective frames $a^2$ and $c$ a suitable fabric $f$ is incorporated. The handle member may be maintained in its in-use position by means of the well known stretcher bars $g$ extending from itself to the strip $a^2$ associated with the shallow box formation $a$. This stretcher bar is broken upwardly when the handle $b$ is collapsed (see particularly Figure 2).

In the collapsed condition (see Figure 4) the folded stretcher bar $g$ swings into adjacency with the handle $b$ pointing rearwardly towards the handle pivot $b^1$.

As applied to another modification (see Figure 5) instead of the strip $a^2$ being attached to the upper edge of the shallow box formation such as $a$ the said strip $a^2$ virtually constitutes the metallic chassis and supports a central well $a^3$ to which the wheels $a^1$ are indirectly connected through their springing mechanism. In the case of a modification there is therefore provided a device which is capable of contracting into a very small compass, whilst in the case of the so-called "bassinette" type of vehicle, a vehicle is presented of pleasing appearance, the upper part of which is together with the handle is capable of being collapsed into adjacency with the lower wooden part, so that its compass is considerably reduced for storage purposes, as for instance, beneath a table or vertically against a wall.

In a modification of the present invention (see particularly Figures 6 and 7) instead of the linkage between the toggle or link systems $d$ extending in the manner aforedescribed, links extending from the centre pivots $d^1$ of the systems may be connected to the opposite extremities of a central common link $i$ which is itself centrally pivoted at $i^1$ to the strip associated with the shallow box formation. In this construction the inward breaking of one toggle or link system brings about a corresponding inward breaking of the opposed toggle or link system.

I claim as my invention:—

1. A perambulator or the like embodying therein, a wheel carrying lower frame, a handle pivoted to said frame, an upper frame, a pair of folding brace-providing links at each side of the perambulator connecting the same end portions of both frames together, and means connecting the handle with the links at one end of both frames and operable in the swinging movement of said handle to cause a movement of the upper frame relative to the lower frame.

2. A perambulator or the like embodying therein, a wheel carrying lower frame, a handle pivoted to said frame, an upper frame, a pair of folding brace-providing links at each side of the perambulator connecting the same end portions of both frames together, means connecting the handle with the links at one end of both frames and operable in the swinging movement of said handle to cause a movement of the upper frame relative to the lower frame and means connecting the handle and one of said frames for locking the handle in one position.

3. A perambulator or the like embodying therein, a wheel carrying lower frame, a handle pivoted to said frame, an upper frame, a pair of folding links each including rule joints at each side of the perambulator connecting the same end portions of both frames together, and means connecting the handle with the links at one end of both frames and operable in the swinging movement of the handle in one direction to cause a movement of the upper frame toward the lower frame, said links in said movement breaking inwardly toward each other.

4. A perambulator or the like embodying therein, a wheel carrying lower frame, an upper frame, a pair of folding braces at each side of the perambulator and each including links pivoted to both frames and to each other by means of folding rule joints, a handle pivoted to the lower frame at a point coincident with that of one of the links of one of said braces to which said handle is secured and means connecting the rule joint of said last mentioned brace with one of the links of the other brace to cause a movement of the upper frame toward the lower frame as said handle is swung toward the lower frame.

5. A perambulator or the like embodying therein, a wheel carrying lower frame, an upper frame, a pair of folding braces at one side of the frame, each brace comprising links pivoted to both frames and to each other for a breaking movement away from the ends of the frame, a handle pivoted on the lower frame and connected to one of said braces and means operative by said brace in the movement of the handle in one direction and connected to one of the links of the other brace for causing a movement thereof similar to that of the first mentioned brace.

6. In a perambulator, upper and lower frames, a pair of braces at each side of the perambulator and each including a pair of jointed links, with the links of each pair connected to both frames and to each other and means connecting said braces and operative as one brace is broken and folded away from its associated end of said frame to cause a breaking of the other brace and a folding thereof away from its associated end of said frames.

In witness whereof I have hereunto set my hand.

FREDERICK HAGGER HEADLEY.